(12) United States Patent
Ferris (10) Patent No.: US 6,662,664 B2
(45) Date of Patent: Dec. 16, 2003

(54) ELECTRONIC PRESSURE SENSING DEVICE

(75) Inventor: Ralph Andrew Ferris, Girard, PA (US)

(73) Assignee: Walker Research LLC, Erie, PA (US)

( * ) Notice: Subject to any disclaimer, the term of this patent is extended or adjusted under 35 U.S.C. 154(b) by 0 days.

(21) Appl. No.: 10/043,139

(22) Filed: Jan. 14, 2002

(65) Prior Publication Data

US 2002/0095993 A1 Jul. 25, 2002

(30) Foreign Application Priority Data

Jan. 17, 2001 (GB) ............................................. 0101241

(51) Int. Cl.[7] ................................................. G01L 7/00
(52) U.S. Cl. .............................. 73/756; 73/753; 73/754
(58) Field of Search ........................ 73/753, 754, 755, 73/19.05, 384, 721, 714, 756; 340/626

(56) References Cited

U.S. PATENT DOCUMENTS 5,069,072 A * 12/1991 Taylor et al. ................. 73/753
6,409,969 B1 * 6/2002 Streicher et al. ........... 604/6.01
2001/0002552 A1 * 6/2001 Vinci .......................... 73/753

* cited by examiner

Primary Examiner—Edward Lefkowitz
Assistant Examiner—Alandra Ellington
(74) Attorney, Agent, or Firm—Larson & Taylor PLC (57) ABSTRACT

An electronic pressure sensing device includes a pressure sensing/transmitter module including at least one pressure sensor having a pair of opposed sensing elements, and a pair of inlet port on the module to supply fluid under pressure to the sensing elements. A plurality of adapters, each having a pair of outlet ports for connection to the inlet ports on the module, whereby each adapter can be selectively coupled to the module. Each adapter is capable of being connected to a different configuration of pressurized fluid supply to feed the associated supply to at least one of the inlet ports on the module. The module further includes an electronic device for interpreting and transmitting the values of pressure sensed by the sensing elements.

11 Claims, 10 Drawing Sheets

ELECTRONIC PRESSURE SENSING DEVICE

This invention relates to an electronic pressure sensing device, and more particularly to such a device for use with fluid filters to determine pressure loss across the filter.

Determining the pressure loss across a filter is an every day occurrence and is a very important factor in determining the filter element(s) potential life expectancy and also the costs associated with power consumption.

Mechanical differential pressure gauges and pop-up indicators are offered by most leading filter manufacturers and these generally bolt directly on top of the filter.

A further enhancement of these mechanical devices is to attach a magnet to the moving parts and, at a pre-set differential pressure, have it coincide with an electrical reed switch thus opening up many options for an electrical interface.

A still further enhancement includes a light fitted within the differential gauge casing such that it can send out a visual (flashing) warning when it reaches a pre-set differential pressure.

Even more elaborate designs include differential pressure gauges with built in electronic sensing which can output linear signals (as opposed to a single switch point) which link directly to hand held computers for determining the cost of electrical power consumption against the cost of fitting new filter elements.

The manufacturing market is moving more and more towards computerization, where every aspect of a production line can be controlled via an electronic interface. There are several standard data transfer interfaces such as 4–20 mA (current loop), RS-232 & 485 (serial type) as well as various field bus systems such as Profibus-EMS, Inter-Bus S. & Ethernet. Each of these systems has its own advantages and disadvantages and some operate in a more refined, higher level than others, therefore representing the vast diversity of actual applications. The most common interface used with gauge and differential pressure transmitters is the 4 to 20 ma (current loop) signal.

Unfortunately, the cost of fitting proprietary electronic differential pressure sensors/transmitters is generally very high, not only due to the cost of the sensor/transmitter itself but also due to the cost of associated pipes, fittings, valves, brackets etc. plus the cost of manpower.

This invention addresses the problems concerned with fitting such devices.

According to the present invention there is provided an electronic pressure sensing device comprising a pressure sensing/transmitter module including at least one pressure sensor having a pair of opposed sensing elements, and a pair of inlet ports on the module to supply fluid under pressure to the sensing elements, the device further comprising a plurality of adapters each having a pair of outlet ports for connection to the inlet ports on the module whereby each adapter can be selectively coupled to the module, each adapter being capable of being connected to a different configuration of pressurized fluid supply to feed the associated supply to at least one of the inlet ports on the module, the module further including electronic means for interpreting and transmitting the values of pressures sensed by the sensing elements.

The sensing/transmitter modules may consist of a metal or plastic enclosure containing at least one piezoresistive sensor integrated with and sealed in a fluid tight manner to two sensor manifolds, one to each end of said sensors, which incorporate male connections with captive double O-ring seals which extend from the front of the module and with which pressure tight connections to any of the adapters may be made.

Furthermore, each sensor manifold may be ported (drilled) in various ways to allow the sensing/transmitter module to operate in at least three different measurement formats by allowing the pressure, directed by the adapters from the application, to be directed to the appropriate sensor pressure port.

Said module may contain all the necessary circuitry with which to accept a 12–24 VDC electric power input and to output a current or voltage signal directly proportional to the pressure being measured with an accuracy greater than ½% of the pressure range being measured.

An integrated electrical connector provides means with which to make input and output electrical connections while maintaining an IP65 seal. A yellow LED may extend from the rear of the case to give a positive indication of power supply to the device.

By way of example only, the invention will now be described in greater detail with reference to the accompanying drawings of which.

SENSOR MANIFOLD PORTING OPTIONS

Figure 13:
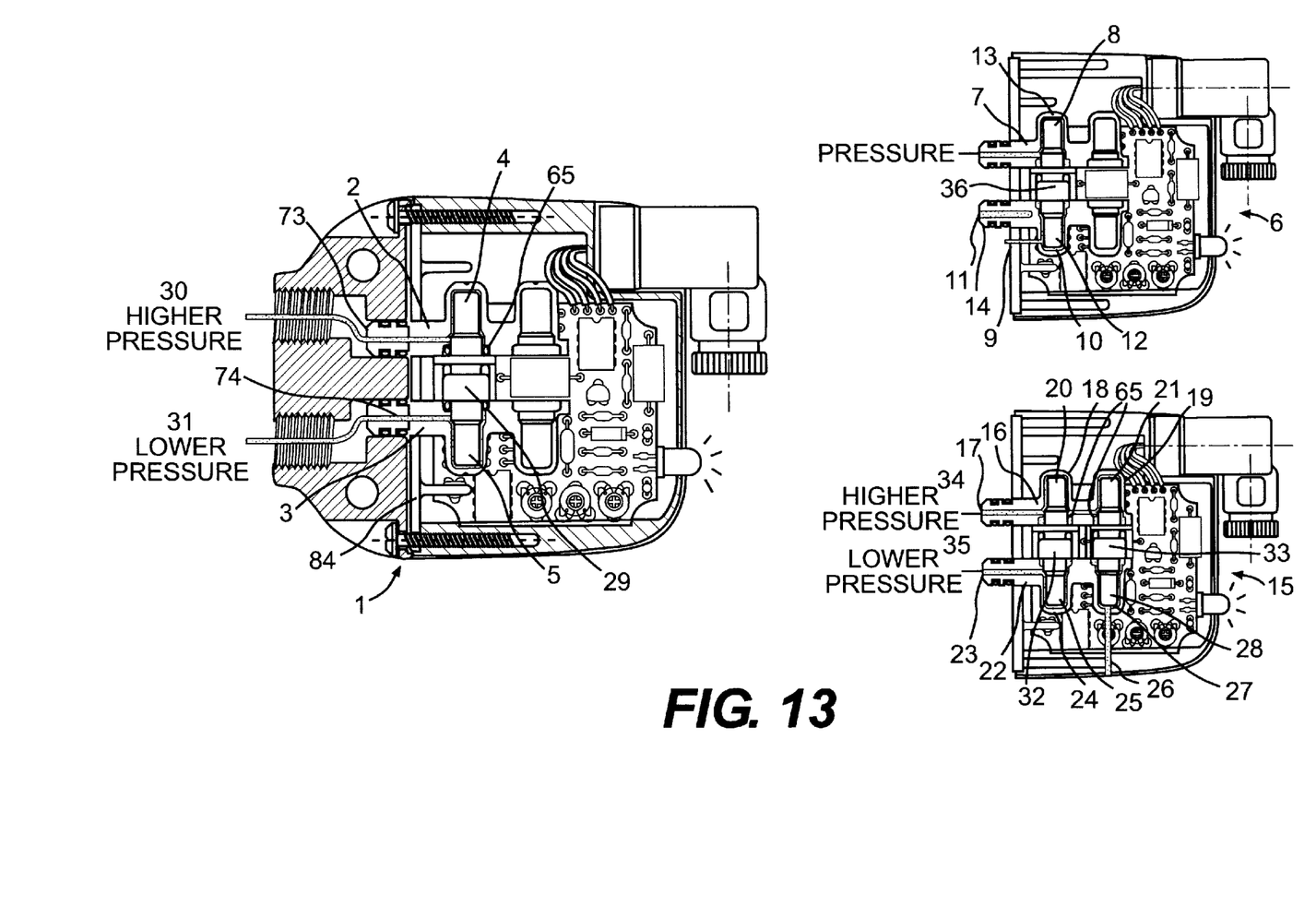
FIG. 13 represents the various ways in which the sensor manifolds can be ported (drilled) in order to allow the rear/sensing transmitter module to be used in various pressure measurement format.

Please refer to FIG. 13.

The sensor manifolds 2, 3 may be ported in at least four different ways to allow the manifolds to be used in three different finished sensing/transmitter module product configurations, 1, 6, 15.

In the differential pressure sensing configuration 1, both manifolds 2, 3 are drilled from the front port 73, 74, through to the first sensor cavity therefore exposing a first end 4 of the sensor 29 to the higher of two pressures and the second end 5 of the sensor 29 to the lower of two pressures.

In the gauge pressure sensing configuration 6, one manifold 7 is drilled from the front port through to the first sensor cavity 13 therefore exposing one end 8 of the sensor 36 to pressure. The second manifold 14 is drilled from the outside of the case 9 through to the second sensor cavity 10 so that the second end 12 of the sensor 36 is exposed to atmospheric pressure. Since the pressure port 11 of the second manifold is not drilled through to the first sensor cavity 10, the sensors low pressure port 11 is isolated from pressure and therefore allows the device to read gauge pressure.

In the differential and gauge pressure sensing configuration 15, the first manifold 16 is drilled from the front port 17 through to both sensor cavities 18, 19 so that one end 20, 21 of both sensors 32, 33 is exposed to the higher of two pressures. The second manifold 22 is drilled from the front port 23 through to the first sensor cavity 24 so that the second end 25 of the first sensor 32 is exposed to the lower of two pressures. A third hole is drilled from the outside of the case 26 into the second sensor cavity 27 such that the second end 28 of the second sensor 33 is exposed to atmospheric pressure. This allows the first sensor 32 to read differential pressure and the second sensor 33 to read gauge pressure.

One Design Facilitates Up to Six Different Measurement Formats

Please refer to FIG. 13.

The device utilizes up to two pressure sensors and one temperature sensor thereby allowing up to six different measurement formats each with its own current or voltage output.

Format 1: Differential Pressure 1.

Utilizes one pressure sensor 29 in the first sensor manifold position to measure the difference in pressure between the higher 30 and lower 31 of two pressures.

Format 2: Differential & Gauge Pressure 15.

Utilizes two pressure sensors 32, 33, to simultaneously measure the differential pressure between the higher 34 and lower 35 of two pressures and the gauge pressure of the higher 34 of the two pressures.

Format 3: Differential Pressure & Temperature.

Utilizes one pressure sensor in the first sensor manifold position to measure the difference in pressure between the upstream and downstream pressures. Additionally a temperature sensor allows measurement of the ambient temperature at the application.

Format 4: Gauge Pressure 6.

Utilizes one pressure sensor 36 in the first sensor manifold position to measure the gauge pressure.

Format 5: Gauge Pressure & Temperature.

Utilizes one pressure sensor in the first sensor manifold position to measure the upstream gauge pressure. Additionally a temperature sensor allows measurement of the ambient temperature at the application.

Format 6: Differential, Gauge & Temperature.

Utilizes two pressure sensors, to simultaneous measure the differential and upstream gauge pressures. Additionally a temperature sensor allows measurement of the ambient temperature at the application.

Reversible Rear Sensing/Transmitter Module

Figure 1:
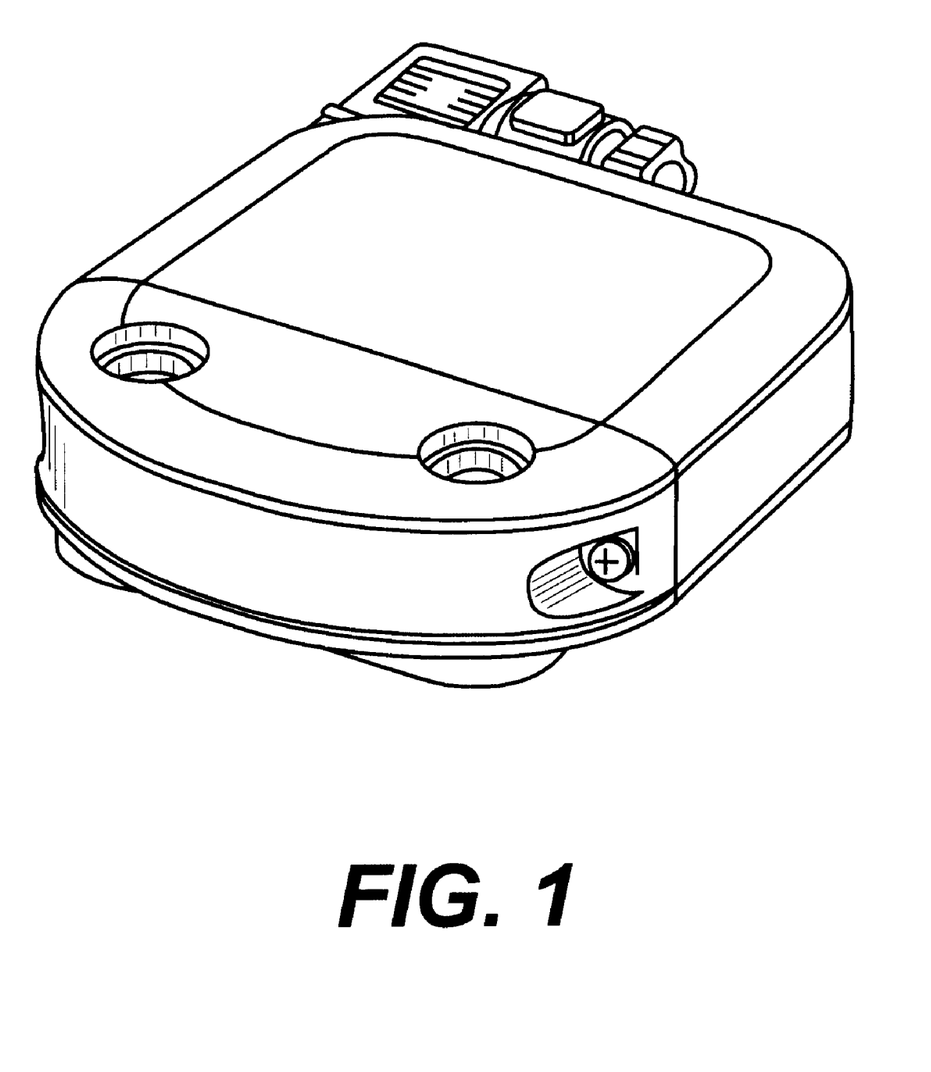
FIG. 1 gives an isometric representation of the assembled device.
Figure 2:
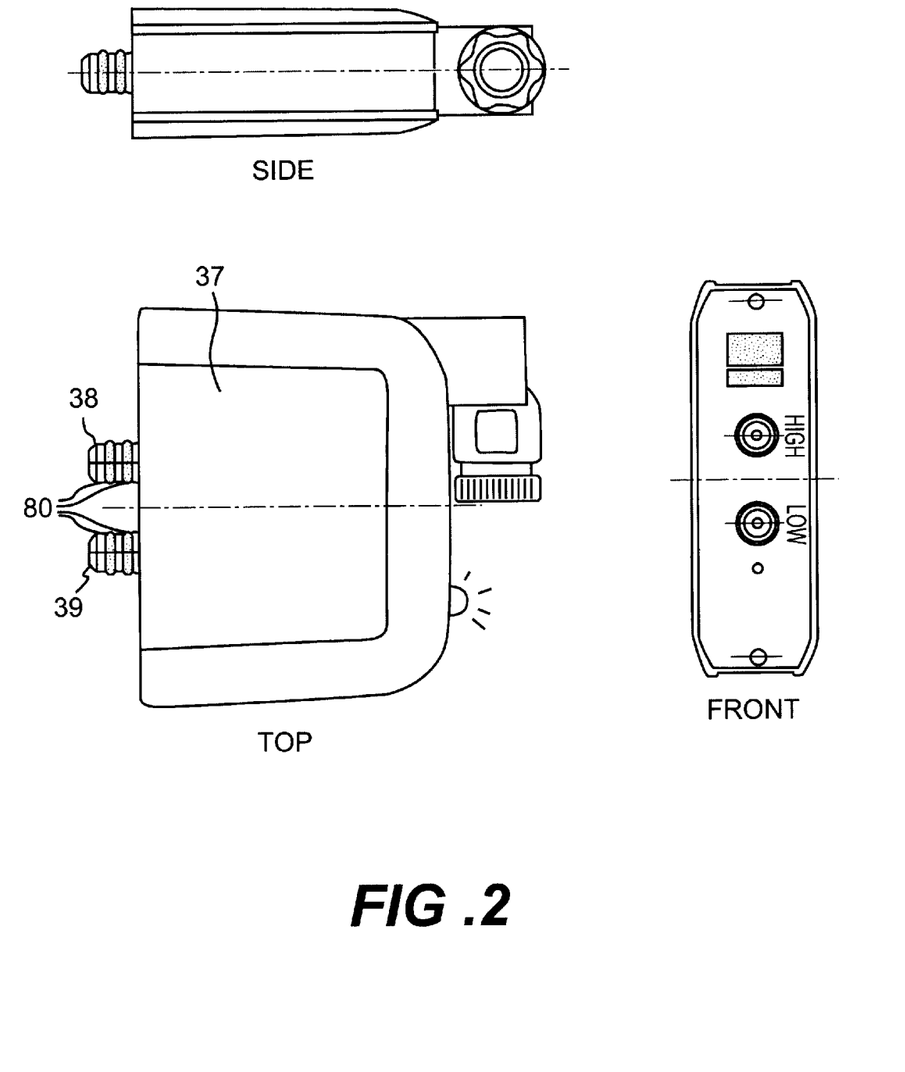
FIG. 2 is a multi-view detail of the rear sensing/transmitter module.

Please refer to FIG. 2.

Since the rear sensing unit 37 has specific high 38 and low 39 ports, it has been designed so that it can be flipped over thus allowing the high or low pressure ports to be easily directed to their proper sources as dictated by the selected front adapter.

Detachable Front Adapters

Figure 8:
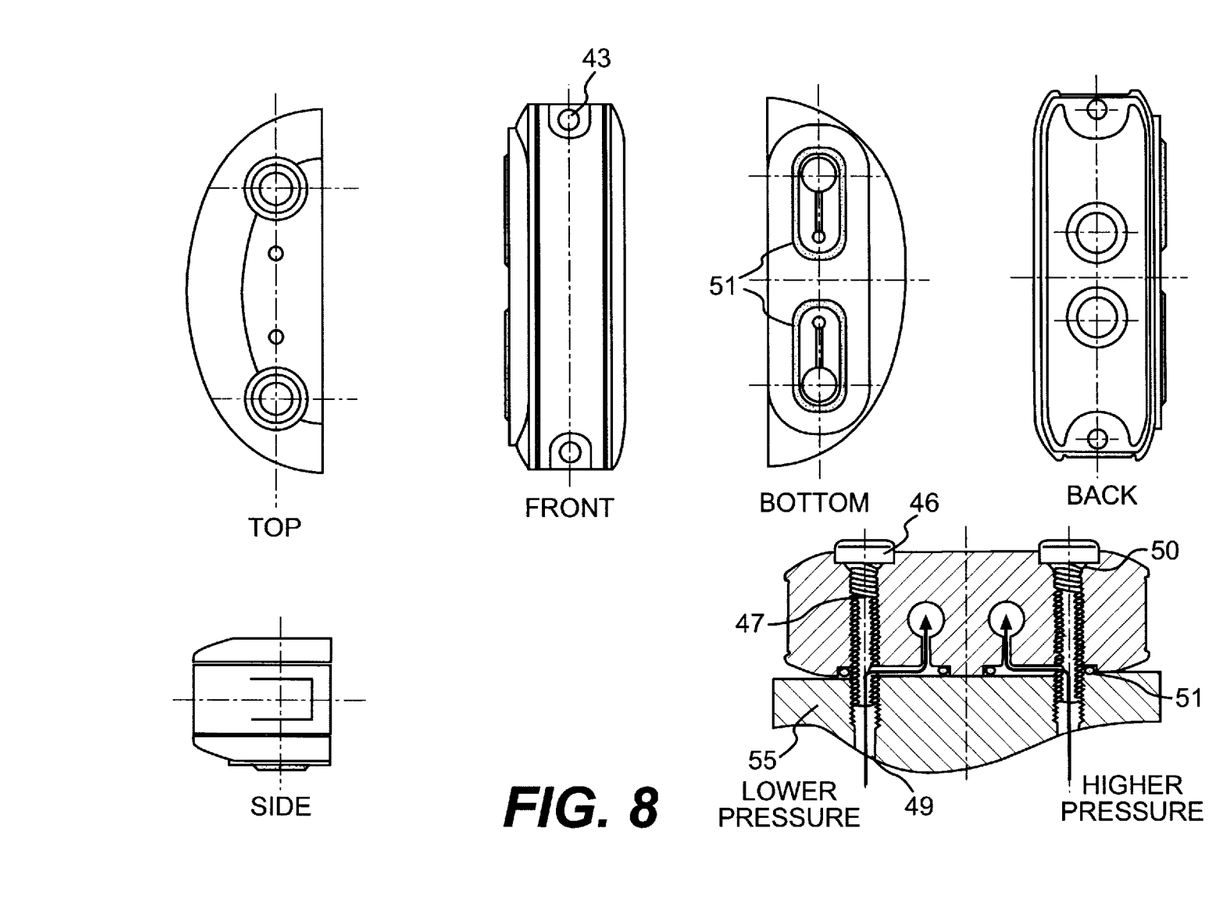
FIG. 8 is a multi-view detail of a front adapter incorporating a 2 hole design.
Figure 9:
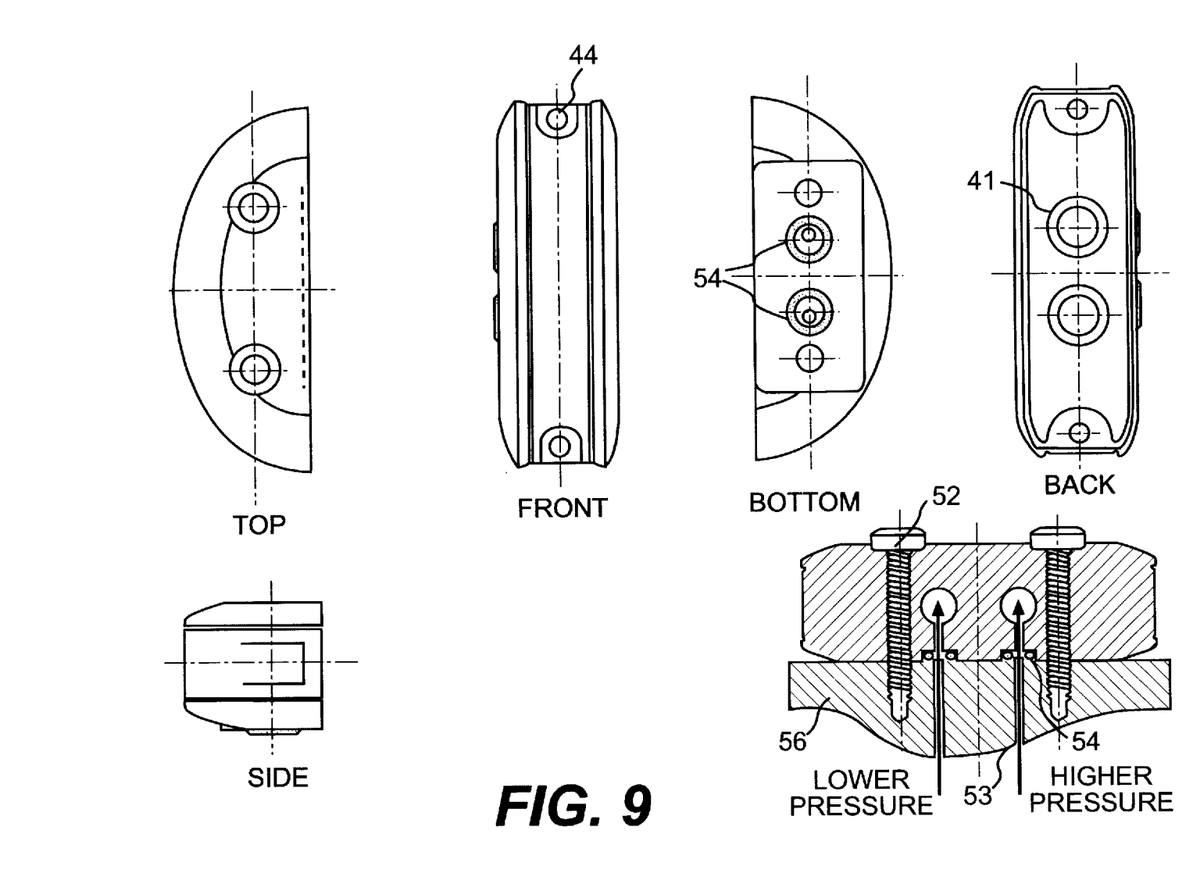
FIG. 9 is a multi-view detail of a front adapter incorporating a 4 hole design.
Figure 10:
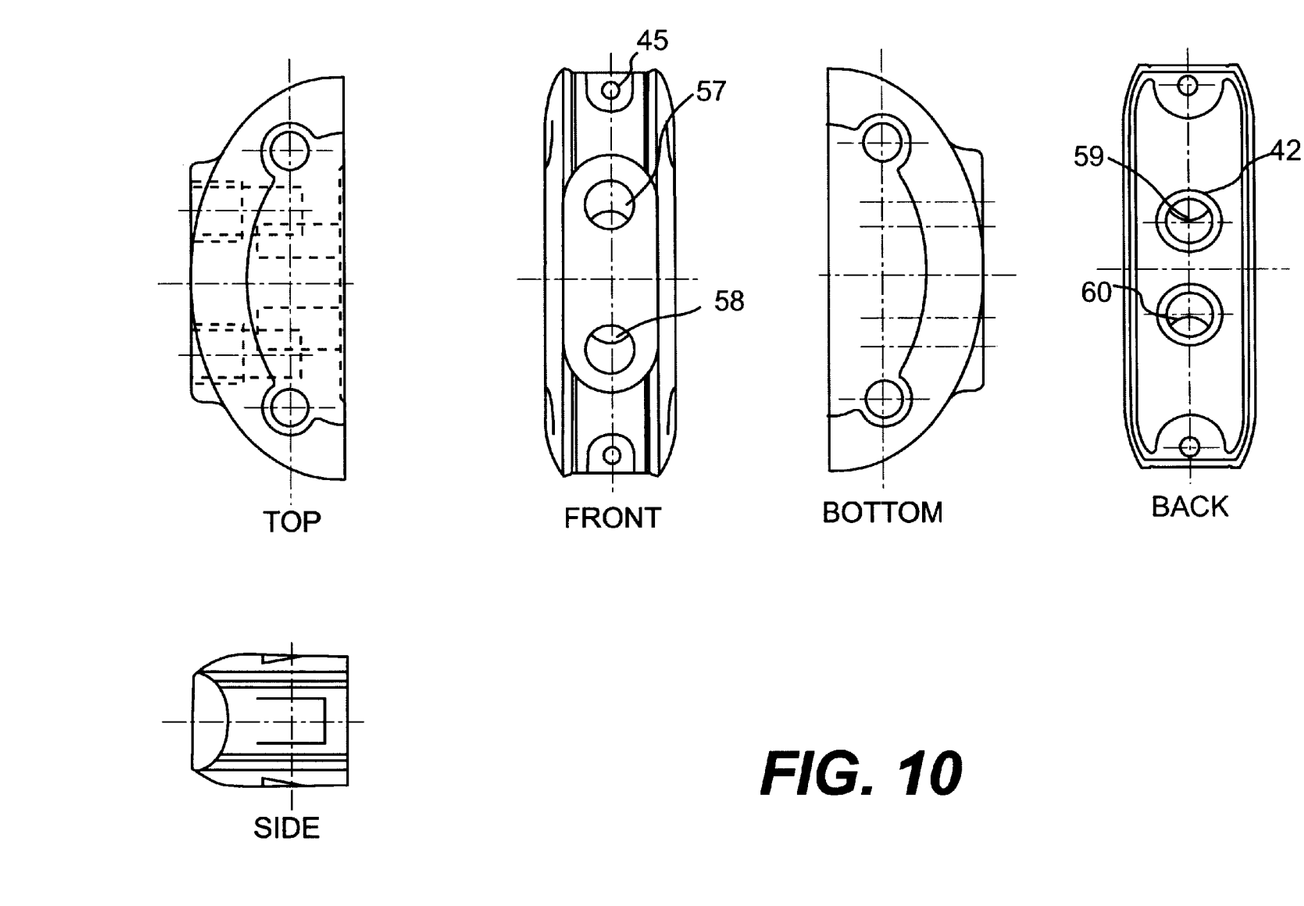
FIG. 10 is a multi-view detail of a front adapter incorporating threaded pipe pressure connections.

Unless otherwise noted, please refer to FIGS. 8, 9 and 10.

Said device has been designed as a two piece system: with the first piece being a front adapter, and the second piece being the actual sensing/transmitter module. All of the different front adapters depicted in FIGS. 8, 9 and 10 have a common connection 40, 41, 42 for mating to the rear sensing/transmitter module. Each of the different adapters also offers a different connection format, to allow the sensing/transmitter module to be connected directly to many different applications. The adapters are each designed to be fastened to the rear sensing/transmitter module via two self tapping screws 43, 44, 45. A fluid tight seal is made between the fastened adapter and the rear sensing/transmitter module via two sets of double O-ring seals 80 held captive on the male pressure ports 38, 39 (FIG. 2) of the sensor manifolds which extend out the front of the sensing/transmitter module.

Two Hole Front Adapter depicted in FIG. 8:

Utilizes a design whereby two special bolts 46, with a flat ground on one side 47, are used to both hold the device in position and also allow the pressure to pass either through or around the bolts and through said conduits 49 to the sensor. O-ring seals 50 are made between the screw head 46 and the top of the adapter as well as O-ring seals 51 between the adapter and the application 55 in order to properly direct the pressure from the application 55 to the sensing/transmitter module.

Four Hole Front Adapter depicted in FIG. 9:

Utilizes a design whereby two bolts 52 are used to hold the device in position whilst two separate ports 53 are used to direct pressure to the pressure manifolds. O-ring seals 54 are made between the inner set of holes 53 and the application 56.

Pipe Connection Adapter depicted in FIG. 10:

Utilizes a design whereby two pipe port connections 57,58 are connected to the two pressure ports 59,60 such that pipe/tube fittings can be used for non-direct mount applications.

Sensor Manifolds Facilitate Simplified Assembly

Figure 5:
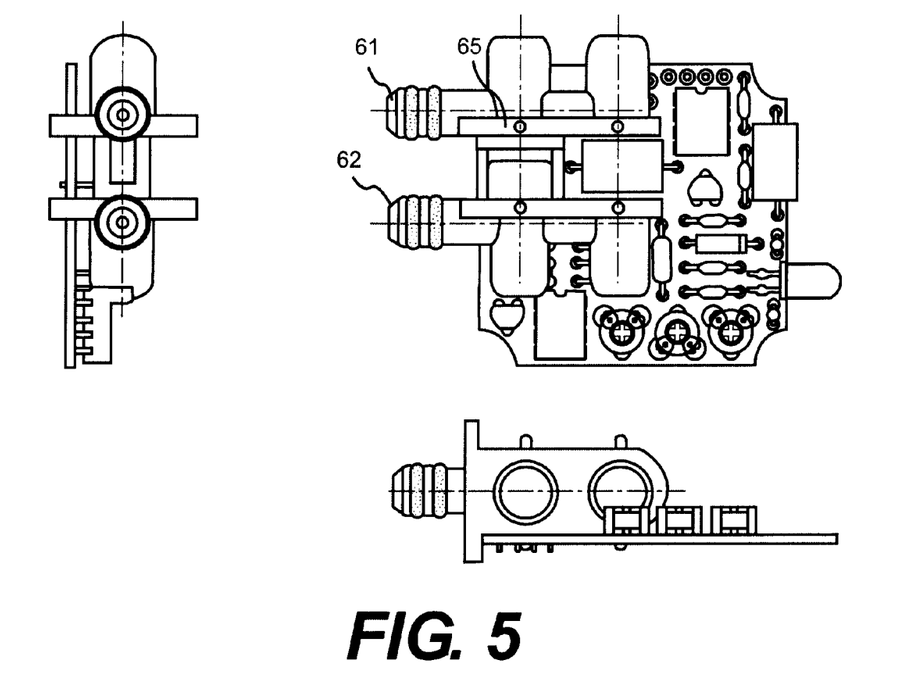
FIG. 5 is a multi-view detail of printed circuit board (electronic circuitry)

Unless otherwise noted, please refer to FIG. 5.

Figure 3:
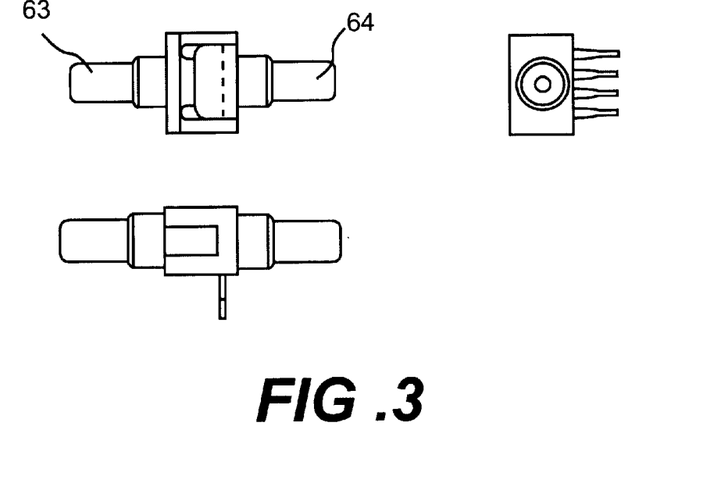
FIG. 3 is a multi-view detail of a piezoresistive pressure sensor.

The device utilizes two sensor manifolds/conduits 61,62, which are designed to fit over either end of the sensor pressure ports 63, 64 (FIG. 3) and seal to the sensor in a fluid tight manner via an O-ring seal 65. Pins, located on the top and bottom edges of the manifolds 66 (FIG. 4), key into holes provided in the printed circuit board. Once engaged into the holes 67 (FIG. 6), the manifolds are mechanically fixed in position parallel to each other with the sensor(s) trapped between. The sensor is soldered to the card 68 (FIG. 6) thus locking the assembly into place.

Figure 6:
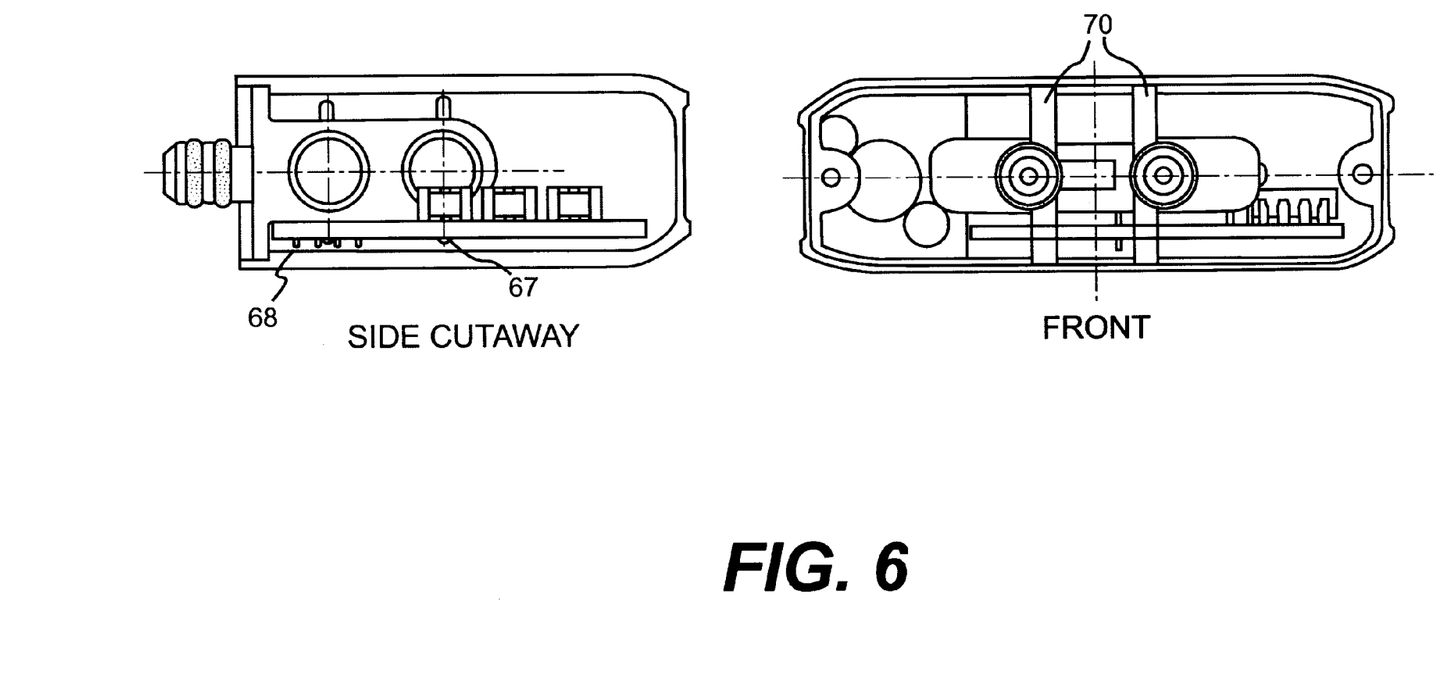
FIG. 6 indicates the way in which the printed circuit board assembly is retained by the enclosure.

In order to maintain the spacing between the internal manifolds, and to ensure that the manifolds do not spread apart far enough to compromise the integrity of the O-ring seal, square extensions 69 at the front of the manifolds 66 (FIG. 4) engage into notches molded into the front of the enclosure 70 (FIG. 6). This connection is the only point of contact between the printed circuit board assembly and the enclosure therefor eliminating many possible component interference problems.

Figure 4:
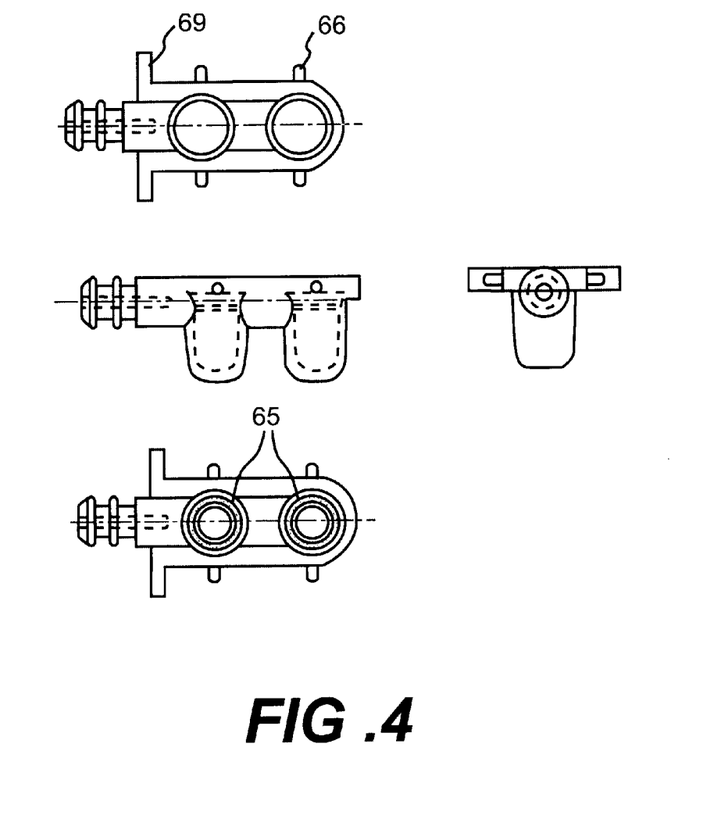
FIG. 4 is a multi-view detail of a sensor manifold.

Although two sensor manifolds are employed in the design they maybe the same part. The manifolds have been designed in a symmetrical manner such that they can be flipped over for use in both positions.

Potting/Encapsulation

Once assembled, the rear sensing/transmitter module is filled with an electrically non (low) conductive potting material. The potting acts to hermetically seal the sensors so that the devices accuracy maybe maximized. O-ring seals 65 between the sensor manifolds and the sensors keep the potting from entering the sensor's pressure ports. Additionally, the potting acts to strengthen the assembly thereby allowing higher operating pressures to be achieved than would otherwise be possible.

Enclosure Cap Trim Piece

Figure 7:
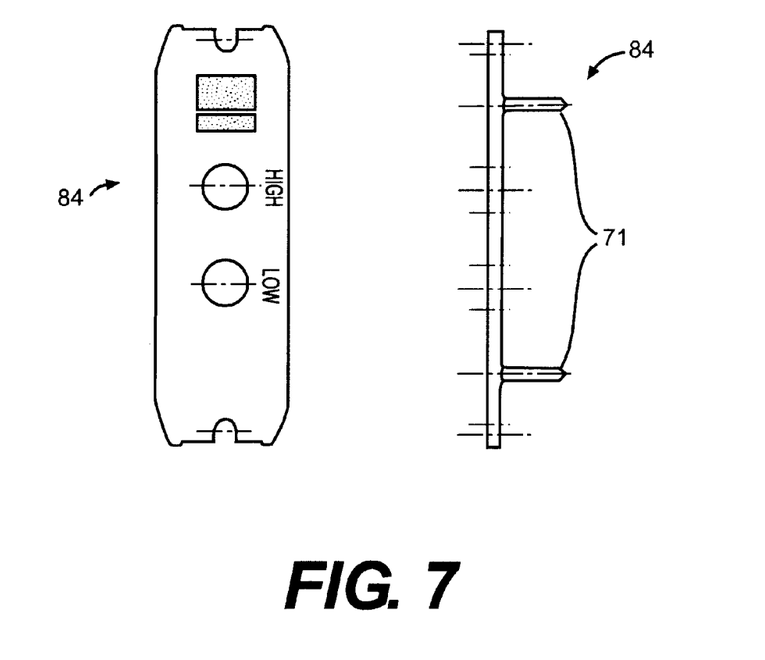
FIG. 7 is a multi-view detail of the enclosure trim lid detail.

Unless otherwise noted, please refer to FIG. 7.

Once the sensor/printed circuit board assembly (FIG. 5) has been properly located within the enclosure and the unit has been filled with potting compound, a trim piece 84 (FIG. 7) may be inserted into the front of the case. The trim piece 84 includes two pins 71, which extend into the potting and lock the piece in place once the potting has set. Furthermore the trim piece 84 acts to ensure that the sensor manifolds have been seated into their proper position before the potting sets.

Snap Fit Front Adapter Option

Figure 12:
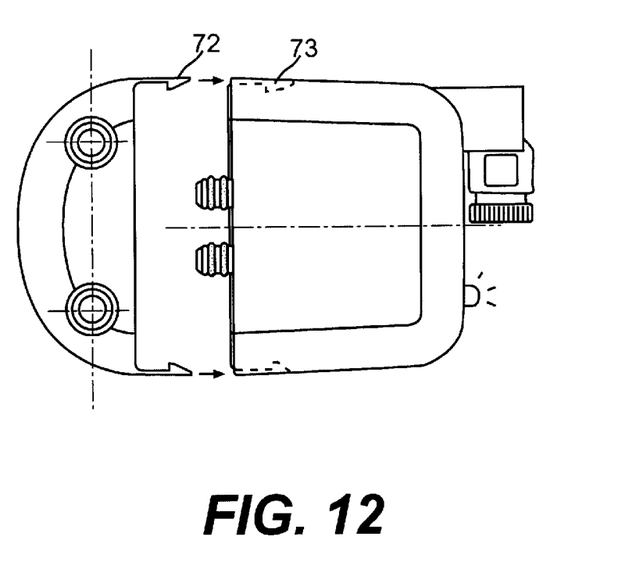
FIG. 12 represents a concept whereby the rear sensing/transmitter module is fastened to the front adapters by means of built-in plastic snap mechanisms.

As an alternate fastening method to the self tapping screws for securing the front adapters to the rear sensing/transmitter module, clips 72 may be molded onto the front adapters which engage into notches 73 in the rear sensing/transmitter module. This would eliminate the need for screws and would speed up assembly and disassembly of the two parts of the device in the field.

Pressure Range Selection

Figure 11:
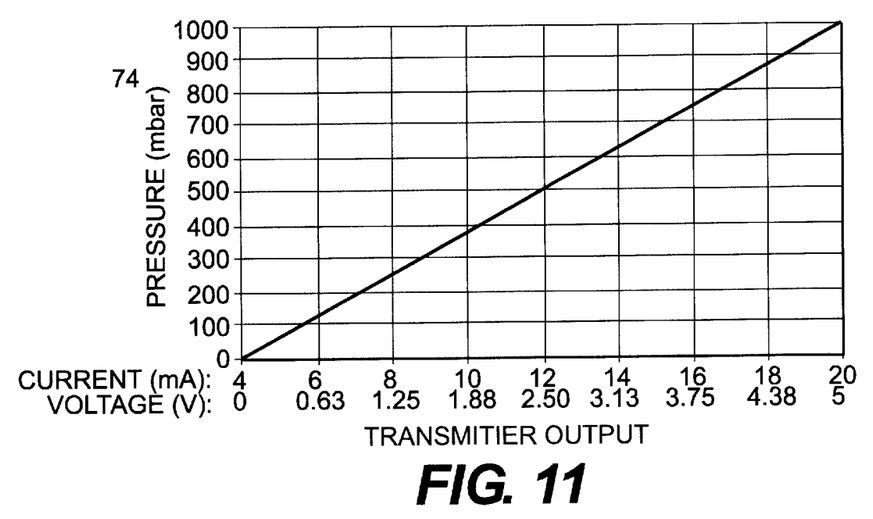
FIG. 11 gives a graph representing the transmitter's electrical outputs in relation to sensed pressure.

Please refer to FIG. 11.

The electronic sensing device may be factory calibrated to a virtually infinite number of pressure ranges 74. The current family of piezoresistive sensors has 7 different members ranging in pre sure ranges from 0.34 to 17 bar. Any of these sensors may be used in this device. The device's sensing range does not have to line up exactly with the raw sensors nominal ratings—i.e. a device utilizing a 0–1000 mbar sensor may be calibrated 0–500 mbar or 0–769 mbar.

Ample Size Conduit Ports

The cross sectional area two the holes and conduits are of great enough size so that they do not unduly restrict or create internal pressure losses which may be realized by momentary flow created in the conduit by fluctuations in pressure at the pressure source. Such fluctuation could a create the accuracy and/or response of the transmitter.

Double O-Ring Seal

Please refer to FIG. 2.

The ends of the sensor manifolds/conduits 38,39 have a double O-ring seal to ensure that no leakage occurs between the rear sensing/transmitter module and the front adapter.

Temperature Compensation

For applications where it is necessary to compensate the sensor's output due to excessive fluid temperature fluctuation, the standard sensor as utilized in the standard design may be replaced by a higher end sensor with built in temperature compensation. By using the higher end sensor, no further changes are required to the device.

Factory Calibration

Each rear sensing/transmitter module can be calibrated prior to assembly. Once calibrated, the unit is filled with potting compound thus eliminating the possibility of field calibration. This feature provides a lower product cost as a seal does not have to be made through the case for each tuning potentiometer. Additionally, the unit cannot be easily bumped out of adjustment.

Electrical Connection Options

Depending on the number of outputs required, the rear sensing/transmitter module may utilize different electrical connectors including but not limited to:

DIN 43650-C: Used for devices with up to 4 input/output connections. Connector has built in screw terminals which facilitates field connections. This connection type is the most common type used on said devices.

12 mm Round Multi-pin Connector: Used for devices with up to 8 input/output connections.

Flying Leads: May be used with any device with any number of input/output connections. Consists of multi-conductor wire with suitable strain relief at point of entry into the sensing/transmitter module. Length of leads may be dictated by the application.

What I claim and desire to secure by Letters Patent is:

1. An electronic pressure sensing device comprising:
    a pressure sensing/transmitter module including
        a base,
        a pressure sensor having first and second opposed fluid pressure sensing elements, said pressure sensor being immovably mounted relative to said base, and
        first and second fluid inlet ports immovably attached relative to said base, said first and second inlet port being in closed fluid communication respectively with said first and second sensing elements to supply respective first and second fluids under pressure to the first and second sensing element,
    a plurality of different adaptors each of which is used for a different application, each said adaptor having
        first and second fluid outlet ports for connection to the first and second inlet ports of the module, and
        a coupling mechanism whereby said different adaptors are each configured to be selected and coupled to the base of said module with the first and second outlet ports fluidly connected to the first and second inlet ports,
        each said different adaptor being further configured for connection to a different configuration of a pressure fluid supply to feed at least a first associated fluid under pressure in the fluid supply to the first inlet port on the module whereby the first fluid under pressure is communicated to said first sensing element associated with said first inlet port,
    an electronic means provided on said base for interpreting and transmitting values of fluid pressures sensed by the first and second sensing elements.

2. A device as claimed in claim 1, wherein the first and second sensing elements of said pressure sensor respectively detect a first fluid having a higher fluid pressure and a second fluid having a lower fluid pressure of the pressure fluid supply thereby to determine a differential between said first and second pressures of the pressure fluid supply.

3. A device as claimed in claim 1, wherein the first sensing element detects the first fluid under pressure of the pressure fluid supply and the second sensing element is subjected to atmospheric pressure whereby a gauge pressure is determined.

4. A device as claimed in claim 1, and further including a second pressure sensor having opposed third and fourth sensing elements, said first and third sensing elements each being arranged to detect a common higher first fluid pressure from the pressure fluid supply, the second sensing element of the first-mentioned sensor being arranged to detect a lower second fluid pressure the pressure fluid supply, and the fourth sensing element of the second sensor being subjected to atmospheric pressure, whereby the differential between the higher and lower fluid pressures and the gauge pressure of the first fluid pressure are determined.

5. A device as claimed in claim 1, in which the module further comprises:

an outer housing attached to aid base, a first manifold attached to said base and located within the housing, said first manifold including said first inlet port extending from the outer housing, a second manifold attached to said base and located within the outer housing, said second manifold including said second inlet port extending from the housing, and the first and second manifold having respective opposed first and second cavities therein in which said first and second cavities the first and second sensing elements of said pressure sensor are received.

6. A device as claimed in claim 1, in which the coupling mechanisms of said adaptors to the base of said module are snap-fit connections therebetween.

7. A device as claimed in claim 1, in which each said adaptor includes a means for attaching said adaptor to a source of fluid under test pressures whereby a higher pressure fluid flows to and through the first outlet port and a lower pressure fluid flows to and through the second outlet port.

8. An electronic pressure sensing device comprising:

a pressure sensing/transmitter module including a base, a pressure sensor having first and second opposed fluid pressure sensing elements, said pressure sensor being immovably mounted relative to said base, and p2 first and second fluid inlet ports immovably attached relative to said base, said first and second inlet ports (a) being in closed fluid communication respectively with said first and second sensing elements to supply respective first and second fluids under pressure to the first and second sensing element, and (b) being disposed with adjacent and parallel inlet axes;

an adaptor which is customized of a specific application, said adaptor having first and second fluid outlet ports disposed with adjacent and parallel outlet axes for complementary connection to the first and second inlet ports of the module, a coupling mechanism whereby said adaptor is coupled to the base of said module with the first and second outlet ports fluidly connected to the first and second inlet ports, and at least a first inlet for connection to a pressure fluid supply of the application to feed at least a first associated fluid under pressure in the fluid supply to the first inlet port on the module whereby the first fluid under pressure is communicated to said first sensing element to associated with said first inlet port; and an electronic means provided on said base for interpreting and transmitting values of fluid pressures sensed by the first and second sensing elements.

9. An electronic pressure sensing device as claimed in claim 8, wherein said coupling mechanism is separate from said first and second outlet ports.

10. A device as claimed in claim 8, and further including a second pressure sensor having opposed third and fourth sensing elements, said first and third sensing elements each being arranged to detect a common higher first fluid pressure from the pressure fluid supply, the second sensing element of the first-mentioned sensor being arranged to detect a lower second fluid pressure of the pressure fluid supply, and the fourth sensing element of the second sensor being subjected to atmospheric pressure, whereby the differential between the higher and lower fluid pressures and the gauge pressure of the first fluid pressure are determined.

11. A device as claimed in claim 8, in which the module further comprises:

an outer housing attached to said base, a first manifold attached to said base and located within the housing, said first manifold including said first inlet port extending from the outer housing, a second manifold attached to said base and located within the outer housing, said second manifold including said second inlet port extending from the housing, and the first and second manifold having respective opposed first and second cavities therein in which said first and second cavities the first and second sensing elements of said pressure sensor are received.

* * * * *